US009485678B2

(12) United States Patent  
Ratnakar

(10) Patent No.: US 9,485,678 B2  
(45) Date of Patent: Nov. 1, 2016

(54) EFFECTIVE UTILIZATION OF CYCLIC PREFIX IN OFDM SYSTEMS UNDER BENIGN CHANNEL CONDITIONS

(71) Applicant: QUALCOMM Incorporated, San Diego, CA (US)

(72) Inventor: Niranjan Nayak Ratnakar, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 13/794,107

(22) Filed: Mar. 11, 2013

(65) Prior Publication Data

US 2014/0254404 A1 Sep. 11, 2014

(51) Int. Cl.
*H04W 24/08* (2009.01)
*H04L 27/26* (2006.01)
*H04L 5/00* (2006.01)

(52) U.S. Cl.
CPC .......... *H04W 24/08* (2013.01); *H04L 27/2607* (2013.01); *H04L 5/0048* (2013.01)

(58) Field of Classification Search
CPC .................................................... H04W 24/08
See application file for complete search history.

(56) References Cited

U.S. PATENT DOCUMENTS

| | | | |
|---|---|---|---|
| 7,859,988 B2 | 12/2010 | Yang et al. | |
| 8,331,298 B2 | 12/2012 | Yeh et al. | |
| 2003/0072452 A1* | 4/2003 | Mody | H04B 7/0669 380/274 |
| 2005/0157682 A1* | 7/2005 | Sandhu | 370/334 |
| 2007/0064669 A1* | 3/2007 | Classon | H04L 1/1822 370/347 |
| 2008/0002645 A1* | 1/2008 | Seki et al. | 370/338 |
| 2009/0122771 A1 | 5/2009 | Cai | |
| 2010/0265968 A1* | 10/2010 | Baldemair | H04L 27/2695 370/503 |
| 2011/0255501 A1 | 10/2011 | Kwon | |
| 2012/0039221 A1 | 2/2012 | Lim et al. | |
| 2012/0281551 A1 | 11/2012 | Alanaerae | |
| 2012/0329448 A1* | 12/2012 | Lim | 455/422.1 |
| 2013/0034054 A1* | 2/2013 | Wu et al. | 370/328 |
| 2013/0185617 A1* | 7/2013 | Roh et al. | 714/800 |

FOREIGN PATENT DOCUMENTS

| | | |
|---|---|---|
| EP | 1858186 A1 | 11/2007 |
| FR | 2845842 A1 | 4/2004 |

OTHER PUBLICATIONS

US 8,351,539, 01/2013, Ko et al. (withdrawn)
International Search Report and Written Opinion—PCT/US2014/020425—ISA/EPO—May 8, 2014.

* cited by examiner

*Primary Examiner* — Brian D Nguyen
*Assistant Examiner* — Toan Nguyen
(74) *Attorney, Agent, or Firm* — Arent Fox LLP

(57) ABSTRACT

System, apparatus, and methods are provided for effective allocation of cyclic prefix resources in OFDM systems under benign channel conditions. Methods may include a first network device receiving a transmission, from a second network device, comprising a symbol and a cyclic prefix. The first network device determines a first signal for a useable portion of the cyclic prefix and determines a second signal for a portion of the symbol corresponding to the useable portion of the cyclic prefix. The first network device determines a third signal based on the first signal and the second signal.

30 Claims, 15 Drawing Sheets

EFFECTIVE UTILIZATION OF CYCLIC PREFIX IN OFDM SYSTEMS UNDER BENIGN CHANNEL CONDITIONS

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

OFDM have the ability to mitigate delay spread. This delay spread is the difference between the earliest and latest arriving signal instances (multipath) at a receiver for a signal transmitted via the wireless channel by a transmitter. These signal instances may have traveled via direct paths and indirect reflected paths formed by obstructions in the environment. The received signal at the receiver is a superposition of all of the arriving signal instances.

Delay spread causes intersymbol interference (ISI), which is a phenomenon whereby each symbol in the received signal acts as distortion to one or more subsequent symbols in the received signal. The ISI distortion degrades performance by impacting the receiver's ability to correctly detect the received symbols. Delay spread can be conveniently combated with OFDM by repeating a portion of each transformed symbol to form an OFDM symbol. The repeated portion is called a cyclic prefix or a guard interval. The cyclic prefix length is equal to the number of samples that is repeated for each transformed symbol.

The cyclic prefix length determines the amount of delay spread that can be combated with OFDM. A longer cyclic prefix length can combat more delay spread. An overprovisioned cyclic prefix length represents extra overhead for each OFDM symbol.

Standard cyclic prefix lengths are often overprovisioned in benign channel conditions with a smaller delay spread. This is especially common with the advent of low power base stations. Therefore, there is a need in the art for techniques to better utilize cyclic prefix resources in OFDM systems under benign channel conditions.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for effective allocation of cyclic prefix resources in wireless communication. In one embodiment, a first network device may receive a transmission, from a second network device, comprising a symbol and a cyclic prefix. The first network device may determine a first signal for a useable portion of the cyclic prefix and may determine a second signal for a portion of the symbol corresponding to the useable portion of the cyclic prefix. The first network device may determine a third signal based on the first signal and the second signal.

In accordance with a related embodiment, a first network device may determine that a second network device is compatible with a specific allocation of cyclic prefix resources. The first network device may allocate cyclic prefix resources, according to the specific allocation, for transmitting additional data and may transmit the additional data on the allocated cyclic prefix resources to the second network device.

In accordance with a further related embodiment, a second network device may determine that a first network device allocated cyclic prefix resources for transmitting additional data and may receive the additional data, on the allocated cyclic prefix resources, from the first network device.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
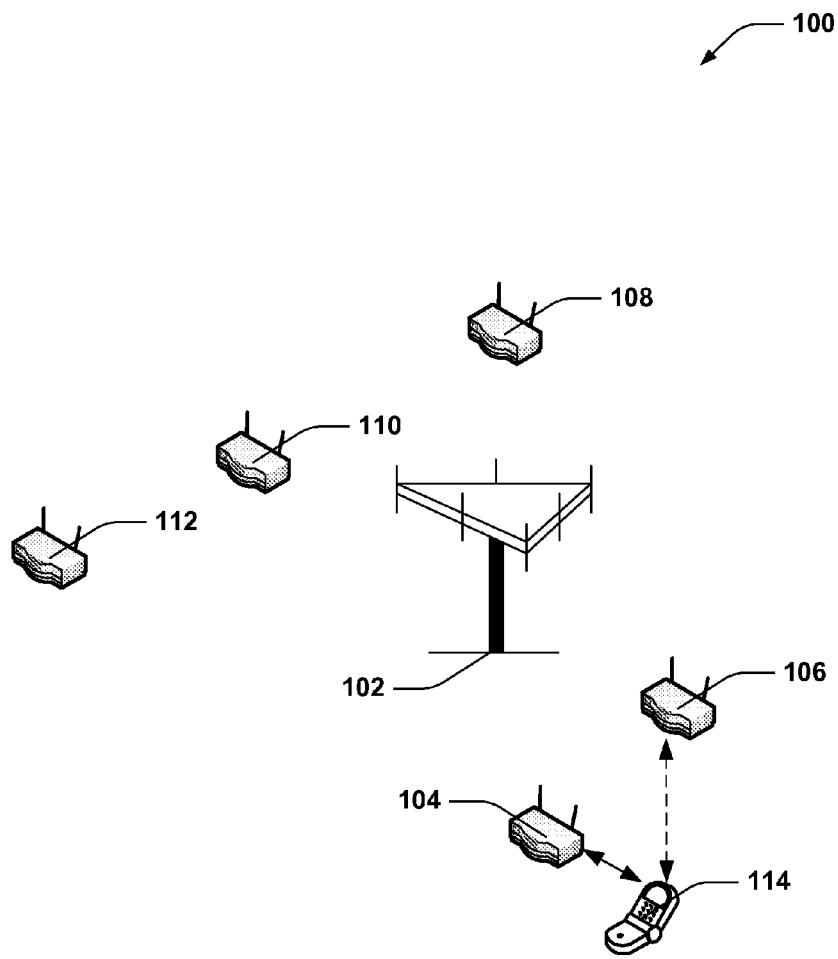
FIG. 1 is a block diagram of an example system that facilitates over-the-air (OTA) communication between neighboring femtocells.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station.

A base station may be utilized for communicating with wireless terminal(s) and may also be referred to as an access point, femto node, a pico node, micro node, a Node B, evolved Node B (eNB), home Node B (HNB) or home evolved Node B (HeNB), collectively referred to as H(e)NB, or some other terminology. These base station are generally considered as low power base station. For example, a low power base station transmits at a relatively low power as compared to a macro base station associated with a wireless wide area network (WWAN). As such, the coverage area of the low power base station can be substantially smaller than the coverage area of a macro base station.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows an example wireless communication system 100. System 100 includes a macro base station 102 that can provide one or more devices with access to a wireless network, as well as a plurality of small nodes (e.g. femto nodes) 104, 106, 108, 110, and 112, which can also provide wireless network access over a backhaul link with a mobile network over a broadband internet connection. In one example, femto nodes 104, 106, 108, 110, and/or 112 can be other types of low power base stations, a relay node, a device (e.g., communicating in peer-to-peer or ad-hoc mode with other devices), etc. Each femto node forms a femtocell (not shown in FIG. 1, but described in greater detail below with reference in FIG. 9). Moreover, system 100 comprises a mobile device 114 that communicates with one or more of the femto nodes 104 and/or 106 to receive wireless access to the mobile network.

OFDM systems have the ability to mitigate delay spread. The delay spread of a wireless channel is the time span or duration of an impulse response for the wireless channel. This delay spread is also the difference between the earliest and latest arriving signal instances (or multipaths) at a receiver for a signal transmitted via the wireless channel by a transmitter. These signal instances may have traveled via a direct/line-of-sight path and indirect reflected paths formed by obstructions in the environment. The received signal at the receiver is a superposition of all of the arriving signal instances.

Delay spread causes intersymbol interference, which is a phenomenon whereby each symbol in the received signal acts as distortion to one or more subsequent symbols in the received signal. The intersymbol interference distortion degrades performance by impacting the receiver's ability to correctly detect the received symbols.

Figure 2A:
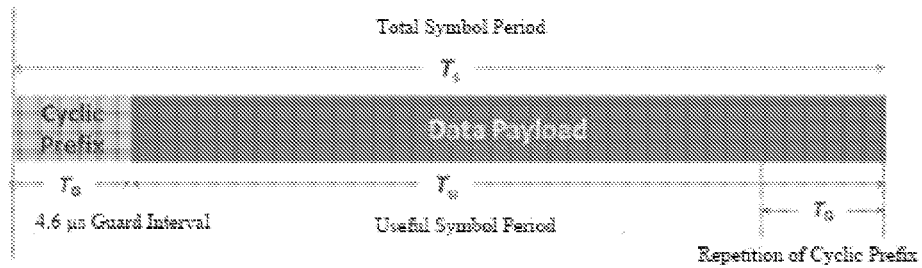
FIG. 2A illustrates a cyclic prefix in relation to a symbol.
Figure 2B:
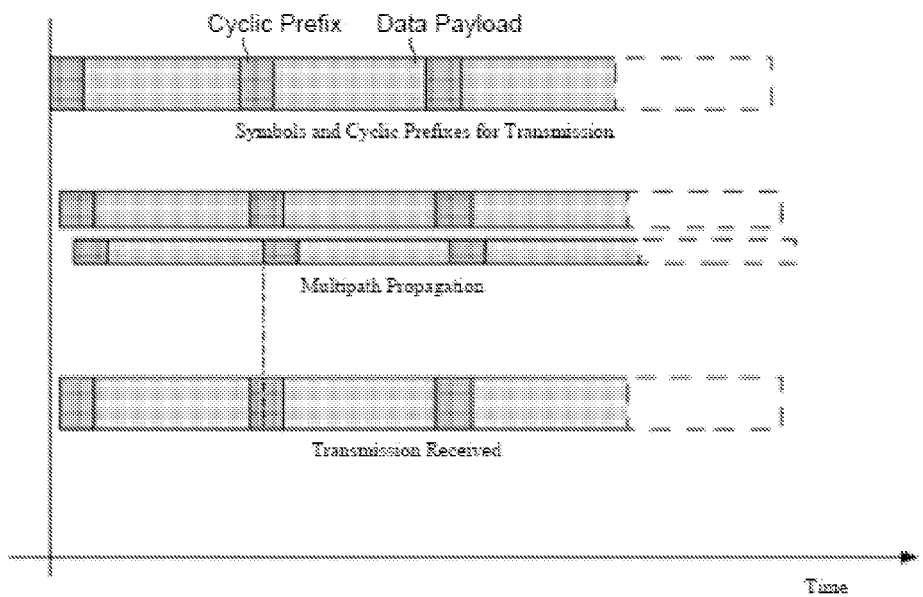
FIG. 2B illustrates a cyclic prefix in multipath propagation.

FIG. 2A illustrates a cyclic prefix in relation to a symbol and FIG. 2B illustrates a cyclic prefix in multipath propagation. Delay spread can be conveniently mitigated with OFDM by repeating a portion of each transformed symbol to form an OFDM symbol. The repeated portion is called a cyclic prefix or a guard interval. The cyclic prefix length is equal to the number of samples that is repeated for each transformed symbol. For example, an OFDM symbol may be 2048 samples in length. The first 144 samples of the OFDM symbol may be used for a standard length cyclic prefix. The remainder 1904 samples in the symbol make up the useful symbol period. The first 144 samples making up the cyclic prefix may be a repeat of the last 144 samples of the useful symbol period. The cyclic prefix length determines the amount of delay spread that can be mitigated with OFDM. A longer cyclic prefix length can mitigate more delay spread. In benign channel conditions, such as when a transmitter is in close proximity to a receiver, the delay spread is greatly reduced. For example, 100 samples from the 144 standard length cyclic prefix may be unnecessary for mitigating delay spread in benign channel conditions if a 44 sample length cyclic prefix is sufficient.

Figure 3:
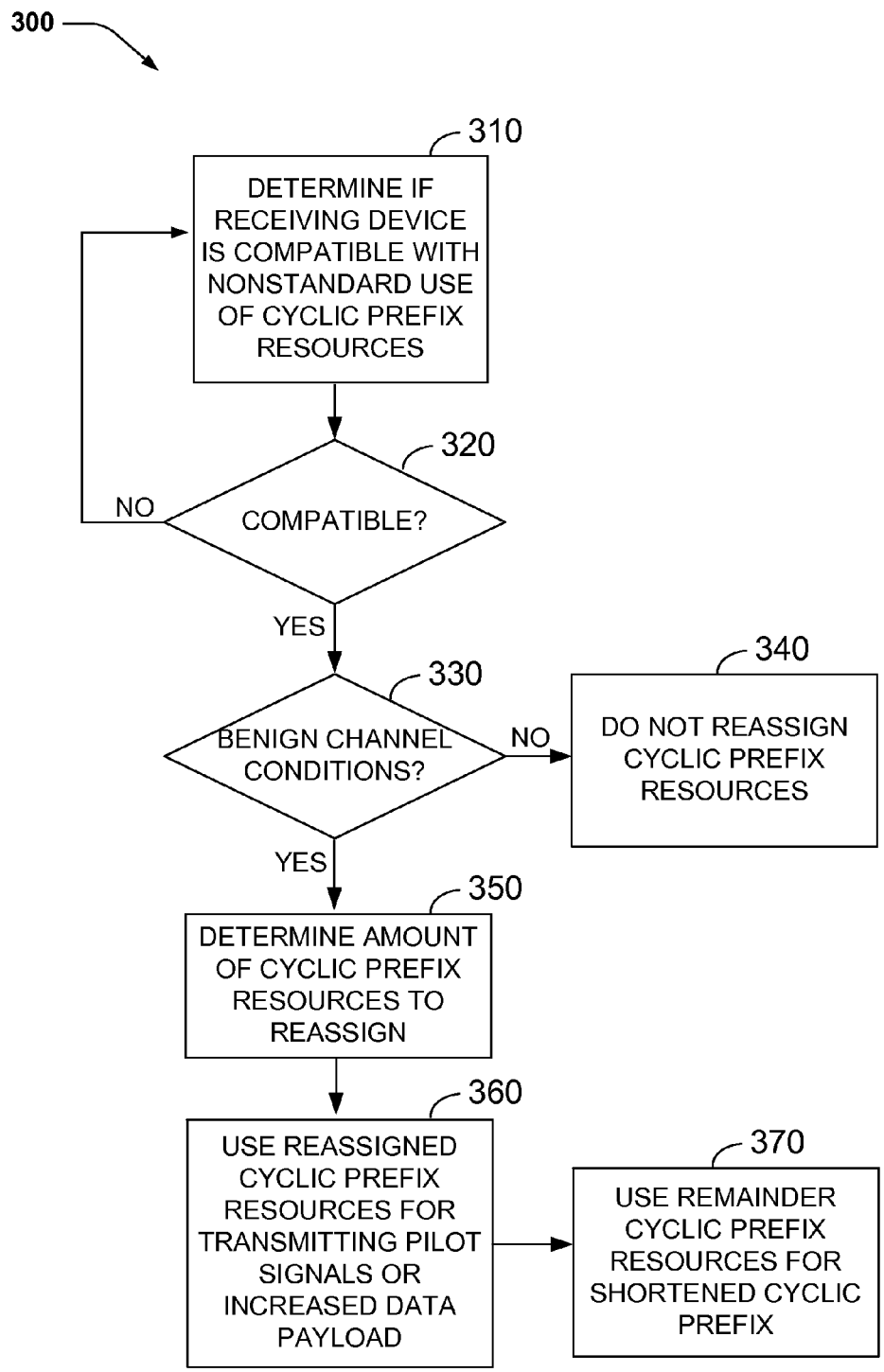
FIG. 3 is a flow chart of an example method, operable by a transmitting device, for effective utilization of cyclic prefix resources.

FIG. 3 is a flow chart of a method 300, operable by a transmitting device, for effective utilization of cyclic prefix resources. The transmitting device (e.g. an access point such as a macro cell, pico cell, or femto cell or an access terminal) may, at 310, determine if a receiving device (e.g. an access point such as a macro cell, pico cell, or femto cell or an access terminal) is compatible with a nonstandard (e.g. not specified by LTE specification standards) use of cyclic prefix resources. If the receiving device is determined not compatible, at 320, the method may restart. If the receiving device is determined compatible, at 320, the transmitting device may, at 330, determine if they are benign channel conditions. Typically, most communications between femtocells and access points will take place in benign channel conditions due to close proximity in comparison to an access terminal served by a macro cell. If the transmitting device is a femtocell, benign channel conditions may be assumed. If the transmitting device is an access terminal served by a femtocell receiving device, then benign channel conditions may also be assumed. If it is determined that benign channel conditions do not exist, at 340, cyclic prefix resources need not be reassigned. If it is determined that benign channel conditions do exist, at 350, the amount of cyclic prefix resources to reassign may be determined. The transmitting device may, at 360, use the reassigned cyclic prefix resources for transmitting additional data (e.g. a pilot signal for improved channel estimation or a short symbol carrying additional data). The transmitting device may, at 370, use remainder cyclic prefix resources for a shortened cyclic prefix.

Figure 4:
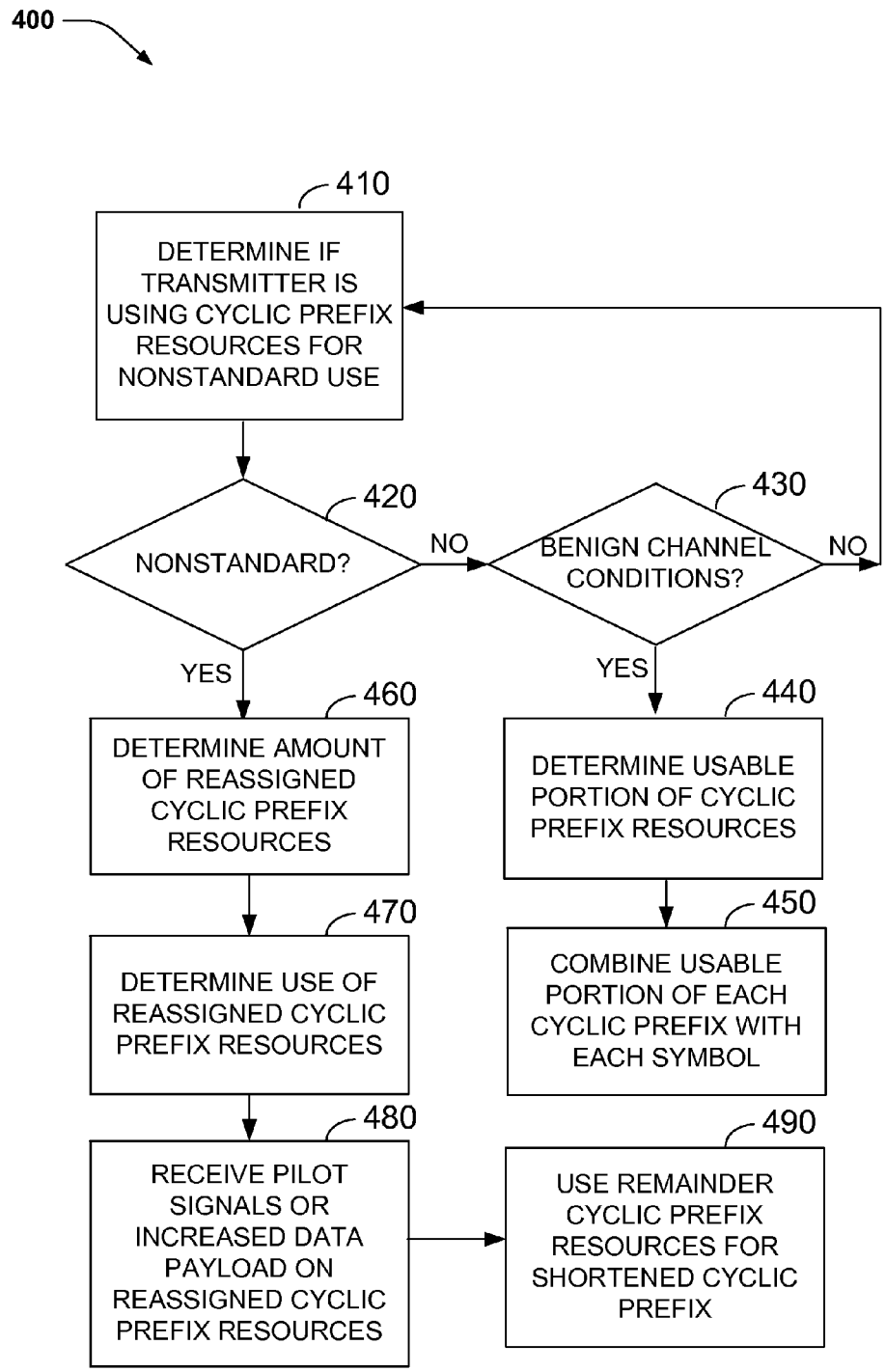
FIG. 4 is a flow chart of an example method, operable by a receiving device, for effective utilization of cyclic prefix resources.

FIG. 4 is a flow chart of a method 400, operable by a receiving device, for effective utilization of cyclic prefix resources. The receiving device (e.g. an access point such as a macro cell, pico cell, or femto cell or an access terminal) may, at 410, determine if a transmitter device (e.g. an access point such as a macro cell, pico cell, or femto cell or an access terminal) is using cyclic prefix resources for nonstandard (e.g. not specified by LTE specification standards) uses. If the use of the cyclic prefix resources is determined nonstandard, at 420, the receiving device may, at 460, determine an amount of the cyclic prefix resources that is reassigned. The receiving device may also, at 470, determine the use of the reassigned cyclic prefix resources. The receiving device may, at 480, receive additional data (e.g. a pilot signal for improved channel estimation or a short symbol carrying additional data) on the reassigned cyclic prefix resources. The receiver device may, at 490, use remainder cyclic prefix resources for a shortened cyclic prefix.

If the use of the cyclic prefix resources is determined not nonstandard, at 420, the receiving device may, at 430, determine if they are benign channel conditions. If it is determined that benign channel conditions do not exist, the method may restart. If it is determined that benign channel conditions do exist, the receiving device may, at 440, determine a useable portion of cyclic prefix resources. The useable portion determination may be based on the amount of delay spread. A larger useable portion may be determined by a smaller delay spread while a smaller useable portion may be determined by a larger delay spread. The receiving device may, at 450, combine (e.g. by averaging) the useable portion of the cyclic prefix with a corresponding section of each symbol, and thus increasing the total signal-to-noise ratio of the channel.

Figure 5:
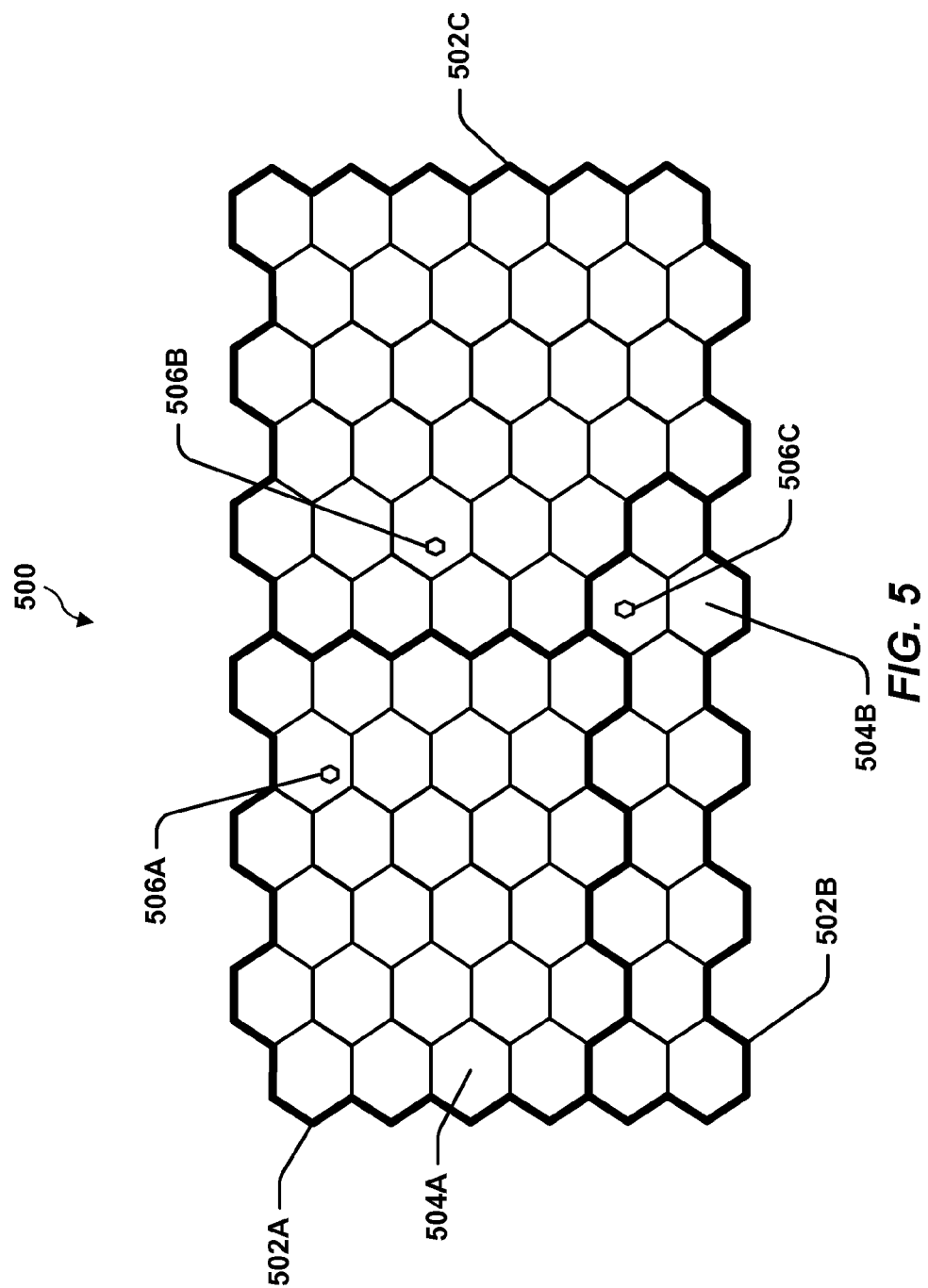
FIG. 5 illustrates an example of a coverage map having several defined tracking areas.

FIG. 5 illustrates an example of a coverage map 500 where several tracking areas 502 (or routing areas or location areas) are defined, each of which includes several macro coverage areas 504. Here, areas of coverage associated with tracking areas 502A, 502B, and 502C are delineated by the wide lines and the macro coverage areas 504 are represented by the hexagons. The tracking areas 502 also include small cell (e.g. femto) coverage areas 506 corresponding to respective small cell nodes, such as femto nodes 52 or 202 or system 500, and which may include the components and implement the functions described above with respect to FIGS. 1-5. In this example, each of the femto coverage areas 506 (e.g., femto coverage area 506C) is depicted within a macro coverage area 504 (e.g., macro coverage area 504B). It should be appreciated, however, that a femto coverage area 506 may not lie entirely within a macro coverage area 504. In practice, a large number of femto coverage areas 506 can be defined with a given tracking area 502 or macro coverage area 504. Also, one or more pico coverage areas (not shown) can be defined within a given tracking area 502 or macro coverage area 504.

Figure 6:
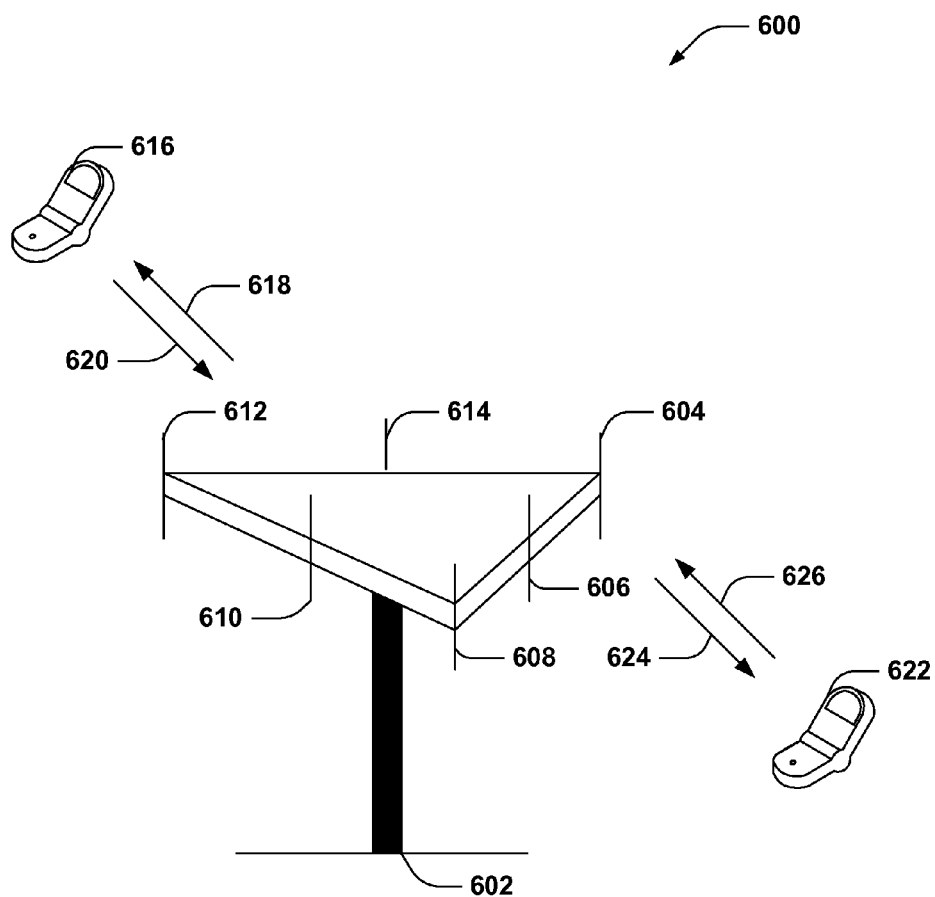
FIG. 6 is a block diagram of an example wireless communication system in accordance with various aspects set forth herein.

Referring now to FIG. 6, a wireless communication system 600 in which mechanisms for intercell communications can be implemented. System 600 comprises a base station 602, which may be a femto node, such as nodes 102 or 202 or system 500, and may include the components and implement the functions described above with respect to FIGS. 1-5. In one aspect, base station 602 can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

Figure 7:
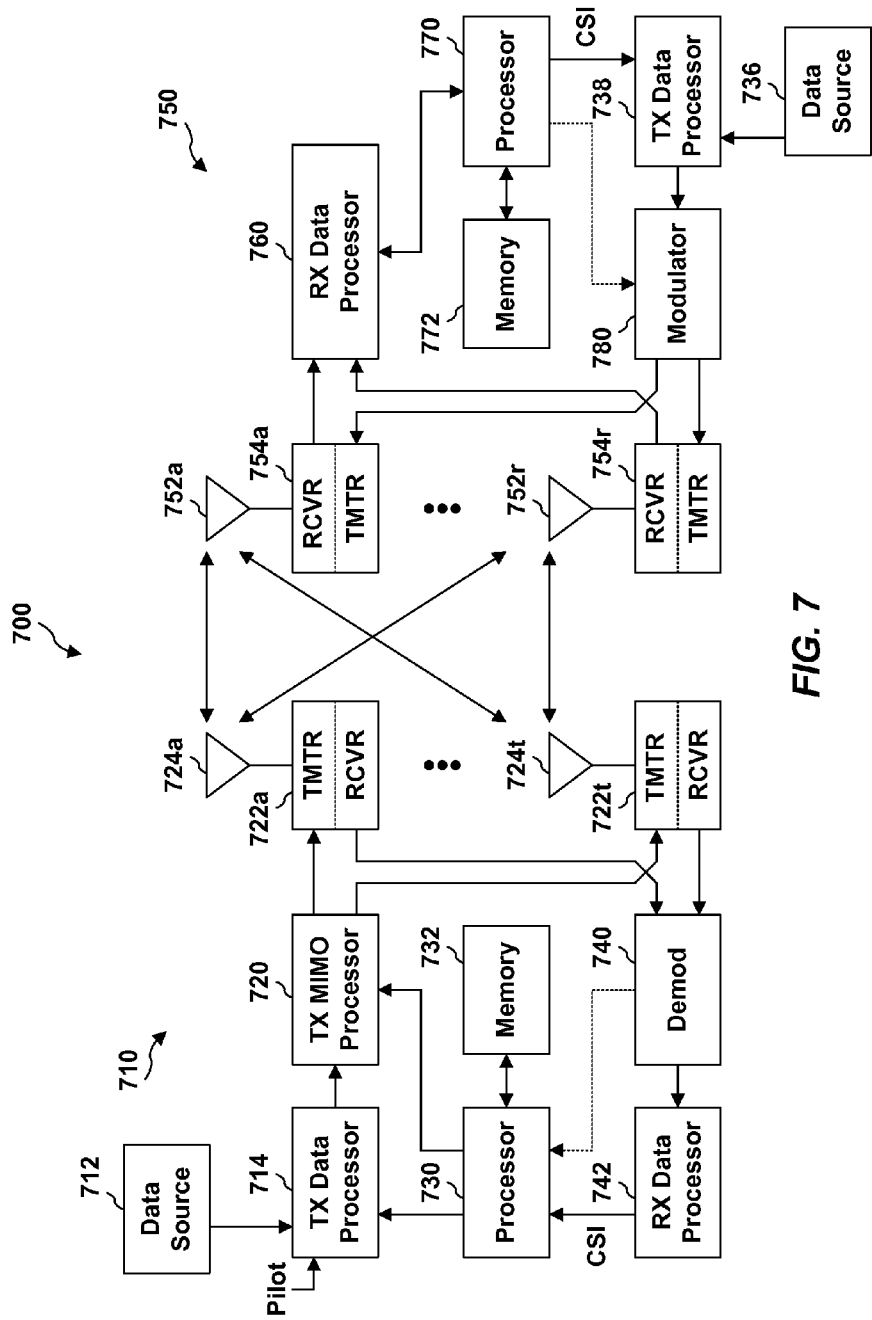
FIG. 7 is an illustration of an example wireless network environment that can be employed in conjunction with the various systems and methods described herein.

FIG. 7 shows an example wireless communication system 700. The wireless communication system 700 depicts one base station 710, which can include a femto node, and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 2, 4, and 6) and/or methods (FIG. 3) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more femto nodes.

Figure 8:
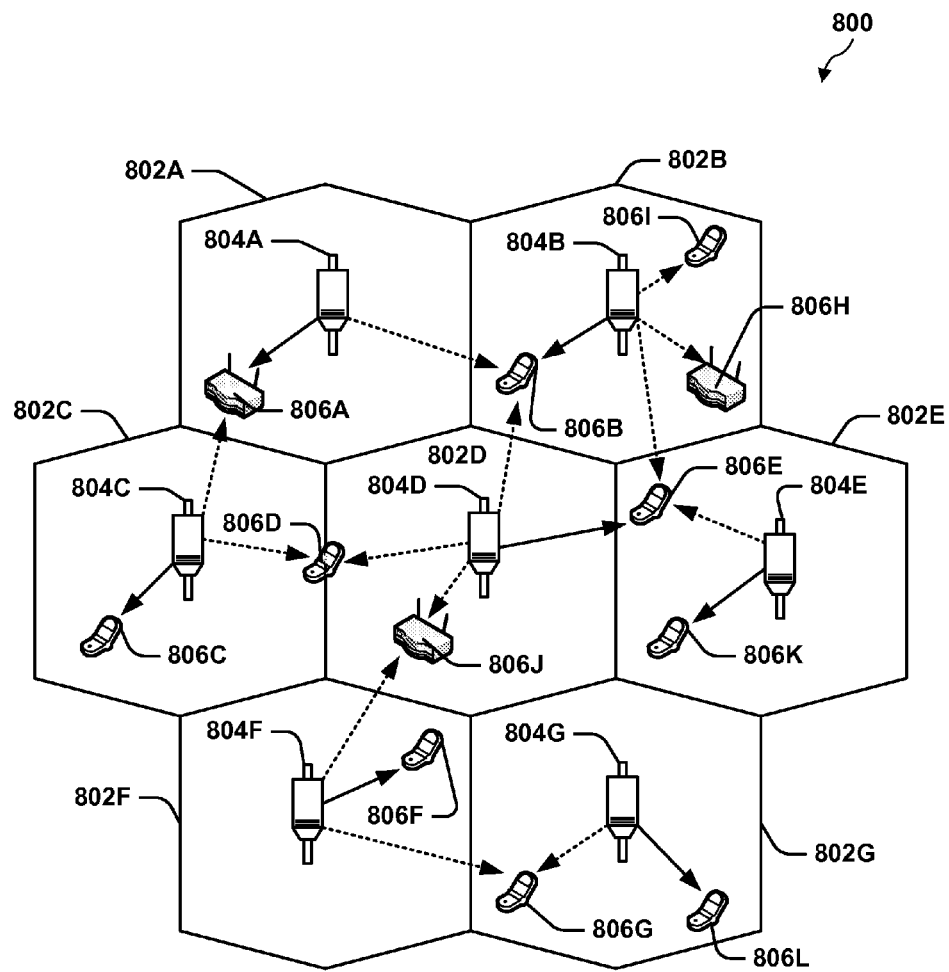
FIG. 8 illustrates an example wireless communication system, configured to support a number of devices, in which the aspects herein can be implemented.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access node 804 (e.g., access nodes 804A-804G). As shown in FIG. 8, mobile devices 806 (e.g., mobile devices 806A-806L) can be dispersed at various locations throughout the system over time. Each mobile device 806 can communicate with one or more access nodes 804 on a forward link (FL) and/or a reverse link (RL) at a given moment, depending upon whether the mobile device 806 is active and whether it is in soft handoff, for example. The wireless communication system 800 can provide service over a large geographic region. In some aspects, some of the mobile devices 806, such as devices 806A, 806H, and 806J, may be femto nodes, such as nodes 102 or 202 or system 500, and may include the components and implement the functions described above with respect to FIGS. 1-5.

Figure 9:
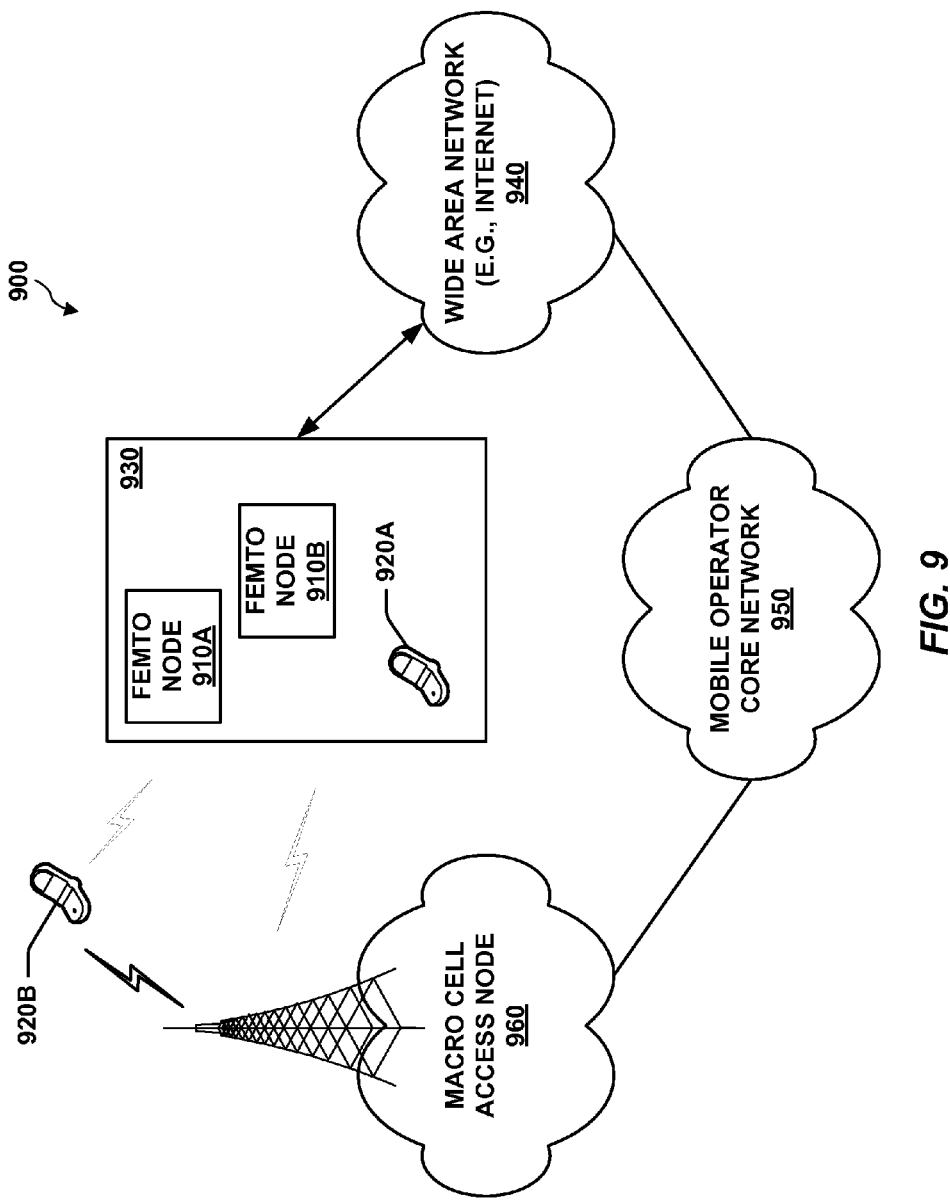
FIG. 9 is an illustration of an exemplary communication system to enable deployment of femtocells within a network environment.

FIG. 9 illustrates an exemplary communication system 900 where one or more femto nodes are deployed within a network environment. Specifically, the system 900 includes multiple femto nodes 910A and 910B (e.g., femtocell nodes or H(e)NB) installed in a relatively small scale network environment (e.g., in one or more user residences 930), which, in one aspect, may correspond to femto nodes 104, 106, 108, 110, and 112 of FIGS. 1-5. Each femto node 910 can be coupled to a wide area network 940 (e.g., the Internet) and a mobile operator core network 950 via a digital subscriber line (DSL) router, a cable modem, a wireless link, or other connectivity means (not shown). As will be discussed below, each femto node 910 can be configured to serve associated mobile devices 920 (e.g., mobile device 920A) and, optionally, alien mobile devices 920 (e.g., mobile device 920B). In other words, access to femto nodes 910 can be restricted such that a given mobile device 920 can be served by a set of designated (e.g., home) femto node(s) 910 but may not be served by any non-designated femto nodes 910 (e.g., a neighbor's femto node).

The owner of a femto node 910 can subscribe to mobile service, such as, for example, 3G mobile service, offered through the mobile operator core network 950. In another example, the femto node 910 can be operated by the mobile operator core network 950 to expand coverage of the wireless network. In addition, a mobile device 920 can be capable of operating both in macro environments and in smaller scale (e.g., residential) network environments. Thus, for example, depending on the current location of the mobile device 920, the mobile device 920 can be served by a macro cell access node 960 or by any one of a set of femto nodes 910 (e.g., the femto nodes 910A and 910B that reside within a corresponding user residence 930). For example, when a subscriber is outside his home, he is served by a standard macro cell access node (e.g., node 960) and when the subscriber is at home, he is served by a femto node (e.g., node 910A). Here, it should be appreciated that a femto node 910 can be backward compatible with existing mobile devices 920.

A femto node 910 can be deployed on a single frequency or, in the alternative, on multiple frequencies. Depending on the particular configuration, the single frequency or one or more of the multiple frequencies can overlap with one or more frequencies used by a macro cell access node (e.g., node 960). In some aspects, an mobile device 920 can be configured to connect to a preferred femto node (e.g., the home femto node of the mobile device 920) whenever such connectivity is possible. For example, whenever the mobile device 920 is within the user's residence 930, it can communicate with the home femto node 910.

In some aspects, if the mobile device 920 operates within the mobile operator core network 950 but is not residing on its most preferred network (e.g., as defined in a preferred roaming list), the mobile device 920 can continue to search for the most preferred network (e.g., femto node 910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 920 can limit the search for specific band and channel. For example, the search for the most preferred system can be repeated periodically. Upon discovery of a preferred femto node, such as femto node 910, the mobile device 920 selects the femto node 910 for camping within its coverage area.

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given mobile device, and so on.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 10:
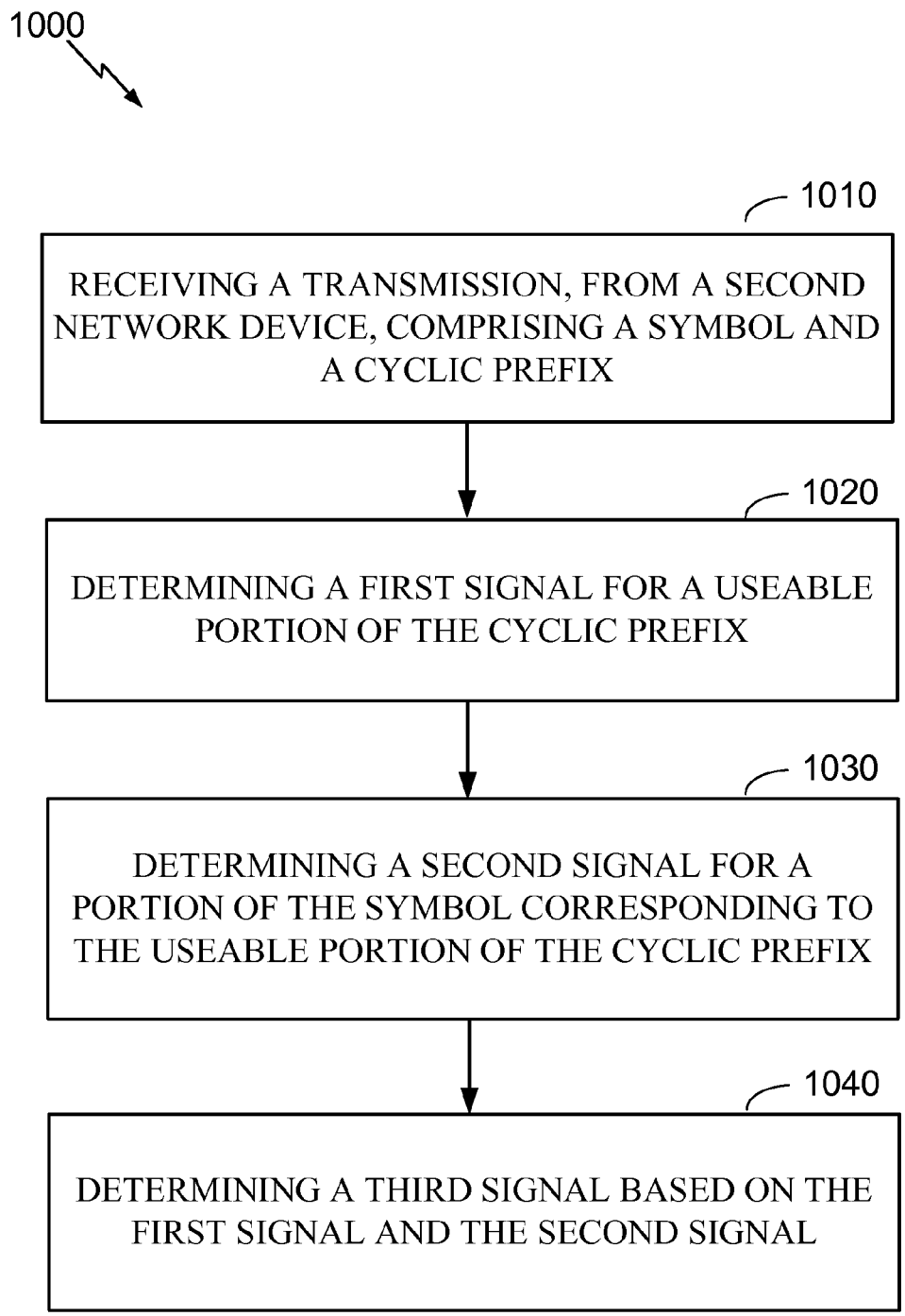
FIG. 10 is a flow chart of an example methodology for OTA communication between neighboring femtocells.

In accordance with one or more aspects of the embodiments described herein, with reference to FIG. 10, there is shown a methodology 1000 for effective allocation of cyclic prefix resources in OFDM systems under benign channel conditions. The method 1000, operable by the network entity or the like or component(s) thereof, may involve, at 1010, receiving a transmission, from a second network device, comprising a symbol and a cyclic prefix. The method 1000 may involve, at 1020, determining a first signal for a useable portion of the cyclic prefix. The method 1000 may involve, at 1030, determining a second signal for a portion of the symbol corresponding to the useable portion of the cyclic prefix. The method 1000 may involve, at 1040, determining a third signal based on the first signal and the second signal.

In related aspects, the method 1000 may further involve determining the existence of benign channel conditions. Determining the existence of benign channel conditions may comprise determining that the first network device is a femtocell. Determining the existence of benign channel conditions may comprise determining that the second network device is a femtocell. The useable portion of the cyclic prefix may be based on a channel quality.

Figure 11:
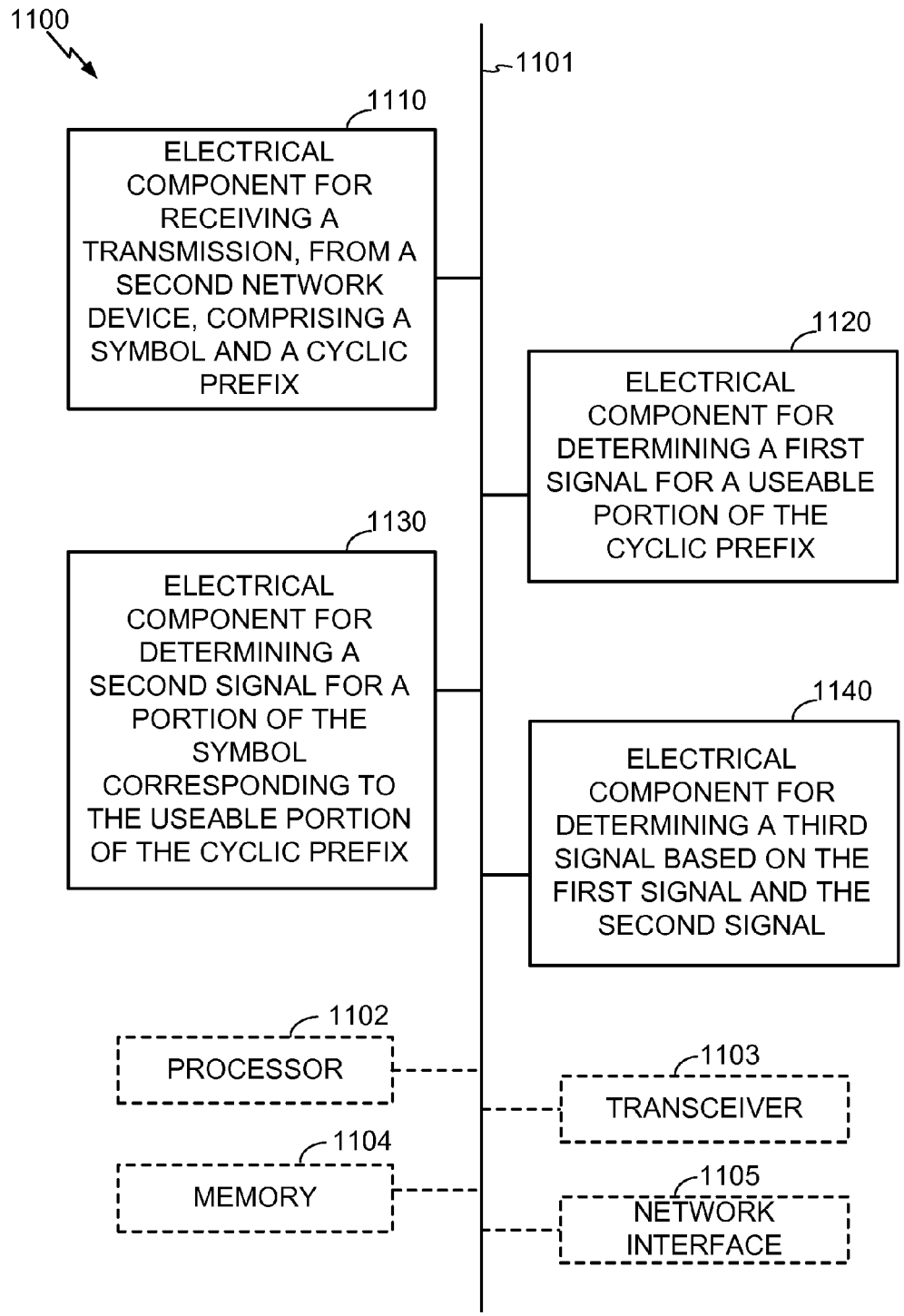
FIG. 11 is a block diagram of an example system for communication between femtocells.

In accordance with one or more aspects of the embodiments described herein, FIG. 11 shows a design of an apparatus 1100 for effective allocation of cyclic prefix resources in OFDM systems under benign channel conditions. The exemplary apparatus 1100 may be configured as a computing device or as a processor or similar device/component for use within. In one example, the apparatus 1100 may include functional blocks that can represent functions implemented by a processor, software, or combination thereof (e.g., firmware). In another example, the apparatus 1100 may be a system on a chip (SoC) or similar integrated circuit (IC).

In one embodiment, apparatus 1100 may include an electrical component or module 1110 for receiving a transmission, from a second network device, comprising a symbol and a cyclic prefix.

The apparatus 1100 may include an electrical component 1120 for determining a first signal for a useable portion of the cyclic prefix.

The apparatus 1100 may include an electrical component 1130 for determining a second signal for a portion of the symbol corresponding to the useable portion of the cyclic prefix.

The apparatus 1100 may include an electrical component 1140 for determining a third signal based on the first signal and the second signal.

In further related aspects, the apparatus 1100 may optionally include a processor component 1102. The processor 1102 may be in operative communication with the components 1110-1140 via a bus 1101 or similar communication coupling. The processor 1102 may effect initiation and scheduling of the processes or functions performed by electrical components 1110-1140.

In yet further related aspects, the apparatus 1100 may include a radio transceiver component 1103. A standalone receiver and/or standalone transmitter may be used in lieu of or in conjunction with the transceiver 1103. The apparatus 1100 may also include a network interface 1105 for connecting to one or more other communication devices or the like. The apparatus 1100 may optionally include a component for storing information, such as, for example, a memory device/component 1104. The computer readable medium or the memory component 1104 may be operatively coupled to the other components of the apparatus 1100 via the bus 1101 or the like. The memory component 1104 may be adapted to store computer readable instructions and data for affecting the processes and behavior of the components 1110-1140, and subcomponents thereof, or the processor 1102, or the methods disclosed herein. The memory component 1104 may retain instructions for executing functions associated with the components 1110-1140. While shown as being external to the memory 1104, it is to be understood that the components 1110-1140 can exist within the memory 1104. It is further noted that the components in FIG. 11 may comprise processors, electronic devices, hardware devices, electronic sub-components, logical circuits, memories, software codes, firmware codes, etc., or any combination thereof.

Figure 12:
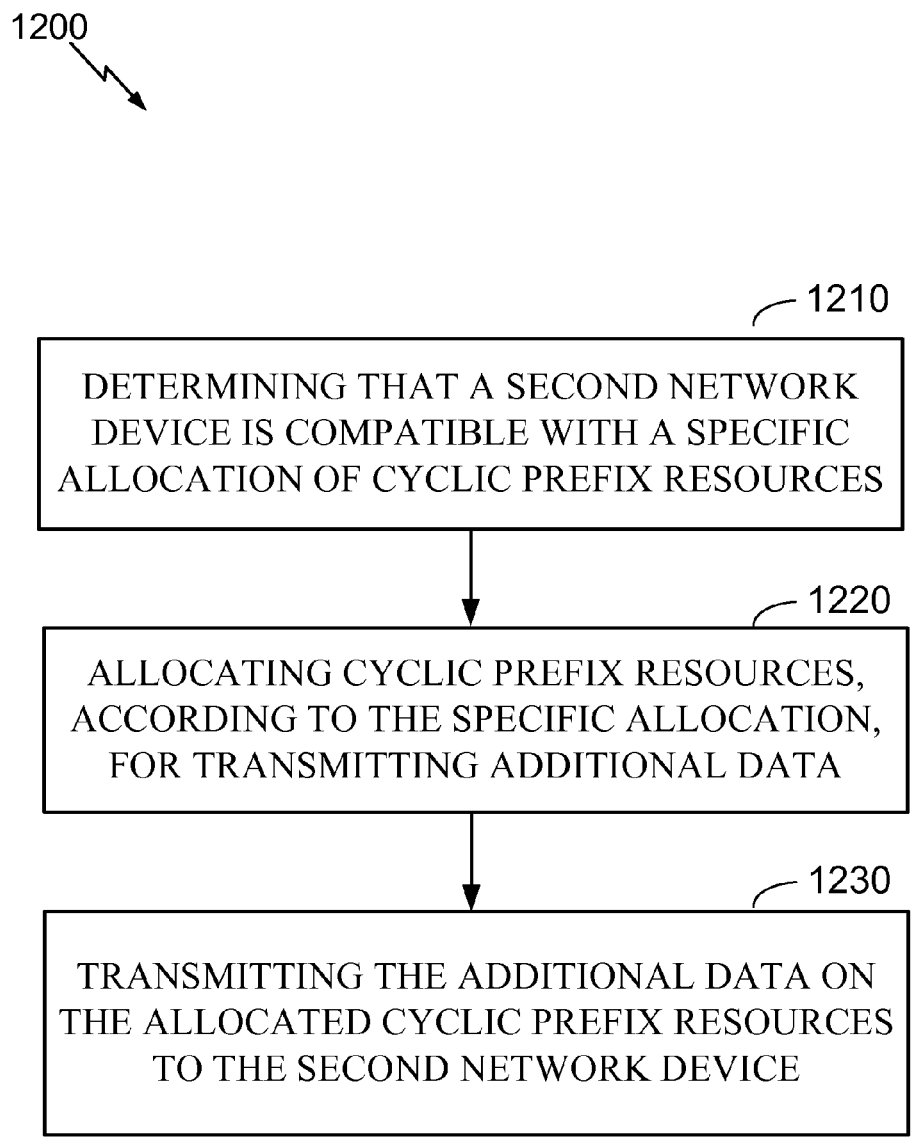
FIG. 12 is a flow chart of an example methodology for OTA communication between neighboring femtocells.

In accordance with one or more aspects of the embodiments described herein, with reference to FIG. 12, there is shown a methodology 1200 for effective allocation of cyclic prefix resources in OFDM systems under benign channel conditions. The method 1200, operable by the network entity or the like or component(s) thereof, may involve, at 1210, determining that a second network device is compatible with a specific allocation of cyclic prefix resources. The method 1200 may involve, at 1220, allocating cyclic prefix resources, according to the specific allocation, for transmitting additional data. The method 1200 may involve, at 1230, transmitting the additional data on the allocated cyclic prefix resources to the second network device.

In related aspects, the method 1200 may further involve determining the existence of benign channel conditions. Determining the existence of benign channel conditions may comprise determining that the first network device is a femtocell. Determining the existence of benign channel conditions may comprise determining that the second network device is a femtocell. The useable portion of the specific allocation may be based on a channel quality. The additional data may comprise a pilot signal. The additional data may comprise a short symbol.

In further related aspects, the method 1200 may further involve sending a configuration message, for the specific allocation, to the second network device. The method 1200 may further involve receiving a configuration message, for the specific allocation, from the second network device.

Figure 13:
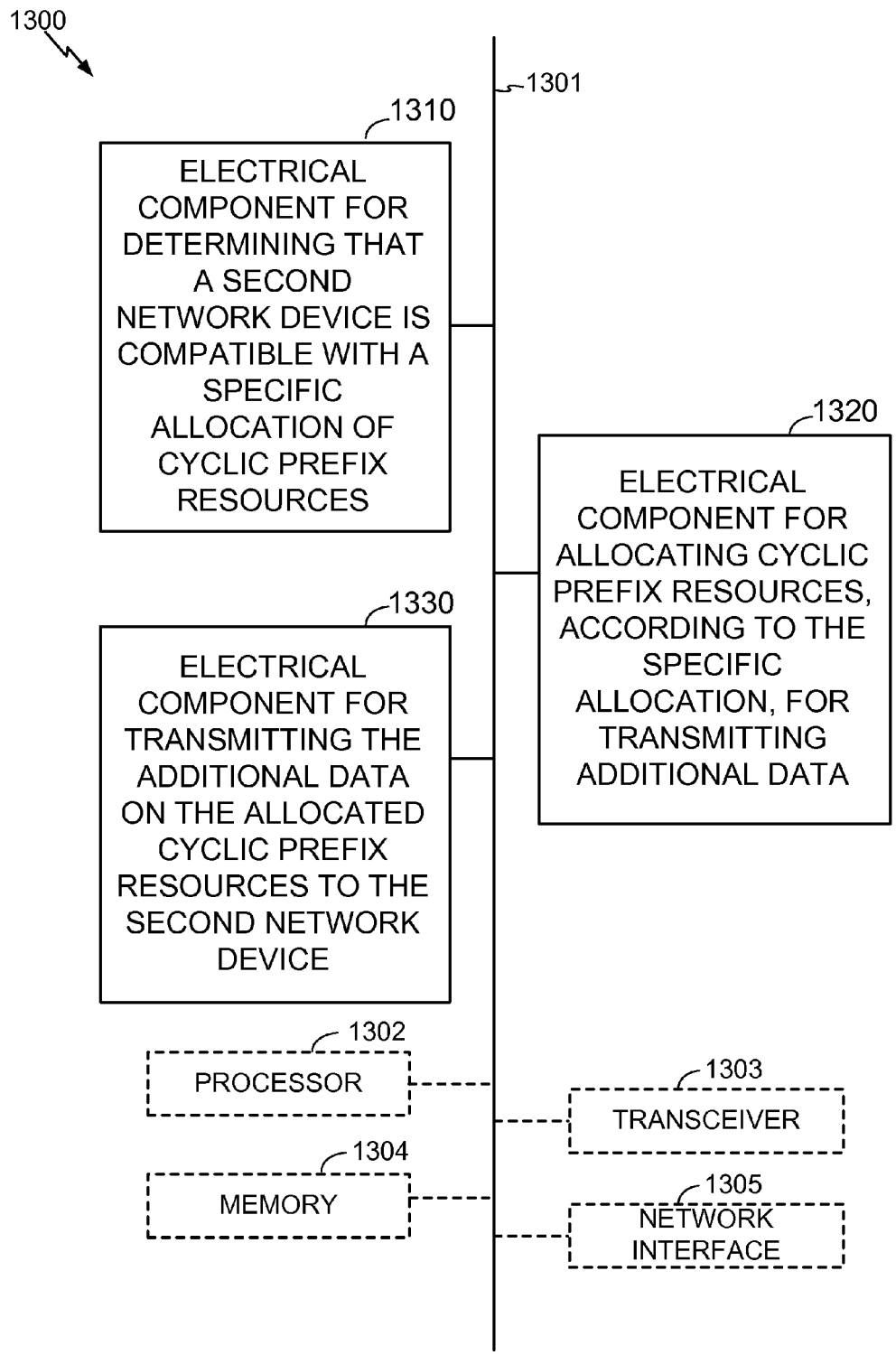
FIG. 13 is a block diagram of an example system for communication between femtocells.

In accordance with one or more aspects of the embodiments described herein, FIG. 13 shows a design of an apparatus 1300 for effective allocation of cyclic prefix resources in OFDM systems under benign channel conditions. The exemplary apparatus 1300 may be configured as a computing device or as a processor or similar device/component for use within. In one example, the apparatus 1300 may include functional blocks that can represent functions implemented by a processor, software, or combination thereof (e.g., firmware). In another example, the apparatus 1300 may be a system on a chip (SoC) or similar integrated circuit (IC).

In one embodiment, apparatus 1300 may include an electrical component or module 1310 for determining that a second network device is compatible with a specific allocation of cyclic prefix resources.

The apparatus 1300 may include an electrical component 1320 for allocating cyclic prefix resources, according to the specific allocation, for transmitting additional data.

The apparatus 1300 may include an electrical component 1330 for transmitting the additional data on the allocated cyclic prefix resources to the second network device.

In further related aspects, the apparatus 1300 may optionally include a processor component 1302. The processor 1302 may be in operative communication with the components 1310-1330 via a bus 1301 or similar communication coupling. The processor 1302 may effect initiation and scheduling of the processes or functions performed by electrical components 1310-1330.

In yet further related aspects, the apparatus 1300 may include a radio transceiver component 1303. A standalone receiver and/or standalone transmitter may be used in lieu of or in conjunction with the transceiver 1303. The apparatus 1300 may also include a network interface 1305 for connecting to one or more other communication devices or the like. The apparatus 1300 may optionally include a component for storing information, such as, for example, a memory device/component 1304. The computer readable medium or the memory component 1304 may be operatively coupled to the other components of the apparatus 1300 via the bus 1301 or the like. The memory component 1304 may be adapted to store computer readable instructions and data for affecting the processes and behavior of the components 1310-1330, and subcomponents thereof, or the processor 1302, or the methods disclosed herein. The memory component 1304 may retain instructions for executing functions associated with the components 1310-1330. While shown as being external to the memory 1304, it is to be understood that the components 1310-1330 can exist within the memory 1304. It is further noted that the components in FIG. 13 may comprise processors, electronic devices, hardware devices, electronic sub-components, logical circuits, memories, software codes, firmware codes, etc., or any combination thereof.

Figure 14:
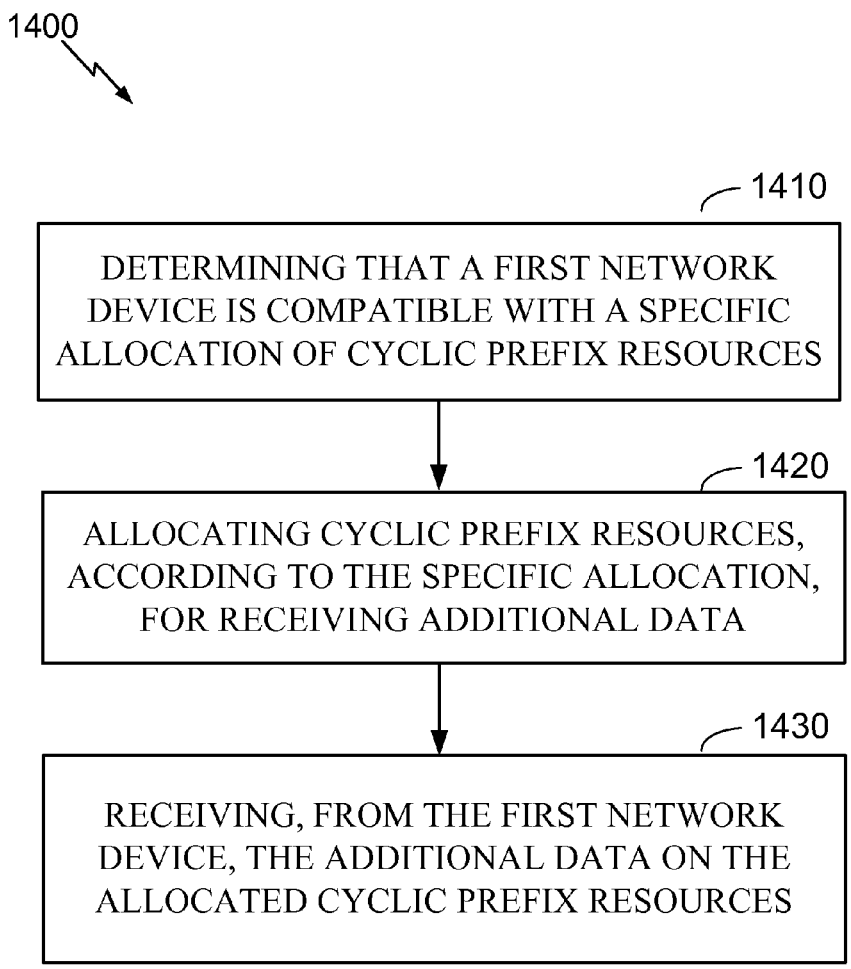
FIG. 14 is a flow chart of an example methodology for OTA communication between neighboring femtocells.

In accordance with one or more aspects of the embodiments described herein, with reference to FIG. 14, there is shown a methodology 1400 for effective allocation of cyclic prefix resources in OFDM systems under benign channel conditions. The method 1400, operable by the network entity or the like or component(s) thereof, may involve, at 1410, determining that a first network device is compatible with a specific allocation of cyclic prefix resources. The method 1400 may involve, at 1420, allocating cyclic prefix resources, according to the specific allocation, for receiving additional data. The method 1400 may involve, at 1430, receiving, from the first network device, the additional data on the allocated cyclic prefix resources.

In further related aspects, the method 1400 may further involve sending a configuration message, for the specific allocation, to the first network device. The method 1400 may further involve receiving a configuration message, for the specific allocation, from the first network device.

Figure 15:
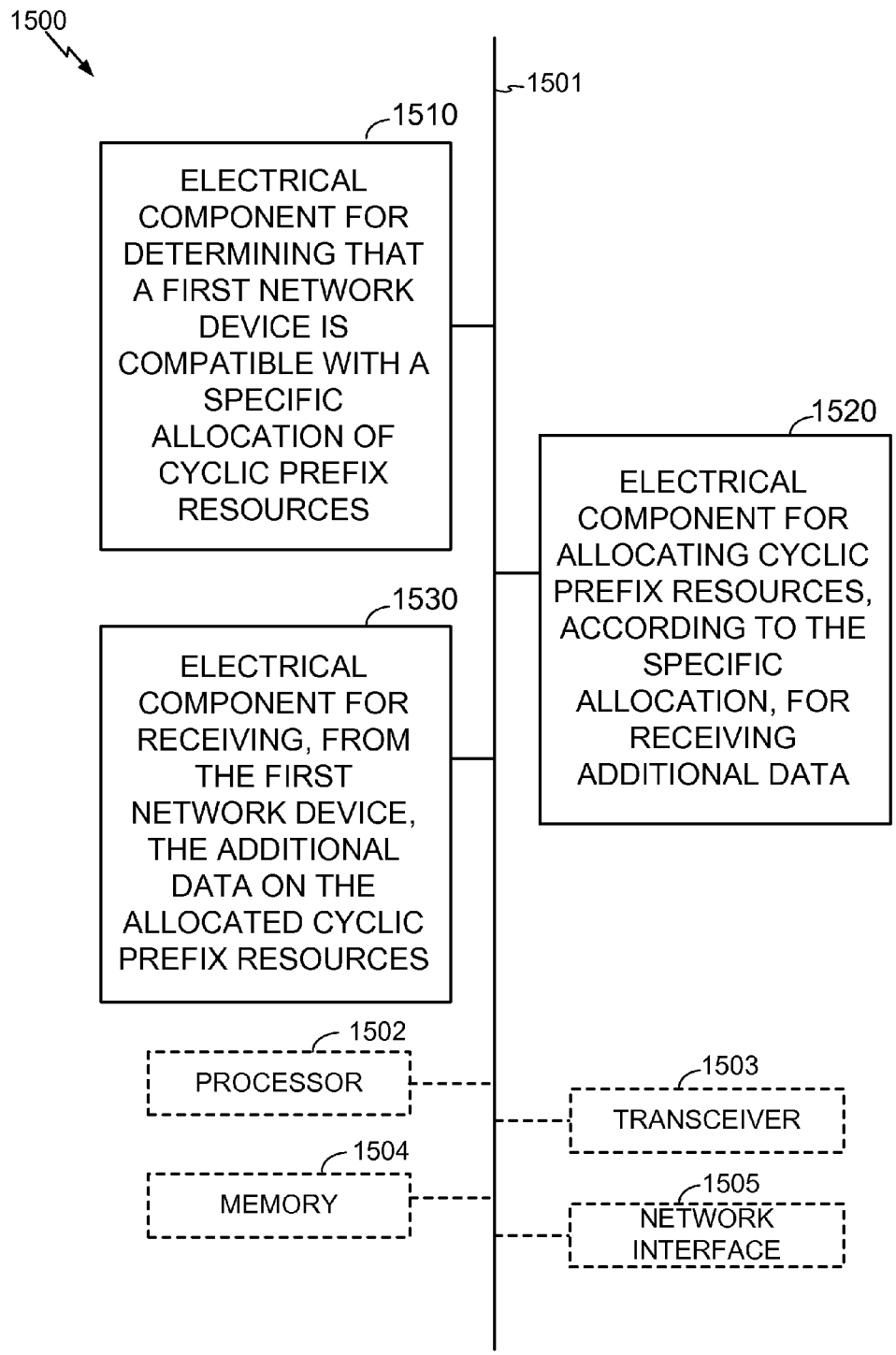
FIG. 15 is a block diagram of an example system for communication between femtocells.

In accordance with one or more aspects of the embodiments described herein, FIG. 15 shows a design of an apparatus 1500 for effective allocation of cyclic prefix resources in OFDM systems under benign channel conditions. The exemplary apparatus 1500 may be configured as a computing device or as a processor or similar device/component for use within. In one example, the apparatus 1500 may include functional blocks that can represent functions implemented by a processor, software, or combination thereof (e.g., firmware). In another example, the apparatus 1500 may be a system on a chip (SoC) or similar integrated circuit (IC).

In one embodiment, apparatus 1500 may include an electrical component or module 1510 for determining that a first network device is compatible with a specific allocation of cyclic prefix resources.

The apparatus 1500 may include an electrical component 1520 for allocating cyclic prefix resources, according to the specific allocation, for receiving additional data.

The apparatus 1500 may include an electrical component 1530 for receiving, from the first network device, the additional data on the allocated cyclic prefix resources.

In further related aspects, the apparatus 1500 may optionally include a processor component 1502. The processor 1502 may be in operative communication with the components 1510-1530 via a bus 1501 or similar communication coupling. The processor 1502 may effect initiation and scheduling of the processes or functions performed by electrical components 1510-1330.

In yet further related aspects, the apparatus 1500 may include a radio transceiver component 1503. A standalone receiver and/or standalone transmitter may be used in lieu of or in conjunction with the transceiver 1503. The apparatus 1500 may also include a network interface 1505 for connecting to one or more other communication devices or the like. The apparatus 1500 may optionally include a component for storing information, such as, for example, a memory device/component 1504. The computer readable medium or the memory component 1504 may be operatively coupled to the other components of the apparatus 1500 via the bus 1501 or the like. The memory component 1504 may be adapted to store computer readable instructions and data for affecting the processes and behavior of the components 1510-1530, and subcomponents thereof, or the processor 1502, or the methods disclosed herein. The memory component 1504 may retain instructions for executing functions associated with the components 1510-1530. While shown as being external to the memory 1504, it is to be understood that the components 1510-1530 can exist within the memory 1504. It is further noted that the components in FIG. 15 may comprise processors, electronic devices, hardware devices, electronic sub-components, logical circuits, memories, software codes, firmware codes, etc., or any combination thereof.

A wireless multiple-access communication system can simultaneously support communication for multiple wireless mobile devices. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of communication, operable by a first network device, the method comprising:
   receiving a transmission, from a second network device, comprising a symbol representing data and a cyclic prefix of a pre-defined length;
   determining if the second network device is compatible with non-standard use of cyclic prefixes;
   determining whether at least one of the first network device or the second network device is a small cell; and
   in response to the determination that the second network device is compatible with non-standard use of cyclic prefixes and the determination that first network device or the second network device is a small cell,
      determining a useable portion of the cyclic prefix for transmission of additional data;
      determining a first signal for the additional data using the useable portion of the cyclic prefix;
      determining a second signal for a portion of the symbol corresponding to the useable portion of the cyclic prefix; and
      combining the first signal and the second signal to generate a third signal.

2. The method of claim 1, further comprising determining the existence of benign channel conditions.

3. The method of claim 2, wherein determining the existence of benign channel conditions comprise determining that the first network device is a femtocell.

4. The method of claim 2, wherein determining the existence of benign channel conditions comprise determining that the second network device is a femtocell.

5. The method of claim 2, wherein the useable portion of the cyclic prefix is based on a channel quality.

6. The method of claim 1, wherein the useable portion of the cyclic prefix is based on a delay spread which is a difference between receiving a first instance of the transmission and receiving a last instance of the transmission.

7. The method of claim 1, wherein combining the first signal and the second signal comprises averaging the useable portion of the cyclic portion with a corresponding section of each symbol.

8. The method of claim 1, wherein the non-standard use of cyclic prefixes is a cyclic prefix having a length not specified by long term evolution (LTE) specification standards.

9. A wireless communication apparatus, comprising:
at least one processor configured to:
- receive a transmission, from a second network device, comprising a symbol representing data and a cyclic prefix of a pre-defined length;
- determine if the second network device is compatible with non-standard use of cyclic prefixes;
- determine whether at least one of the first network device or the second network device is a small cell; and
- in response to the determination that the second network device is compatible with non-standard use of cyclic prefixes and the determination that first network device or the second network device is a small cell,
  - determine a useable portion of the cyclic prefix for transmission of additional data;
  - determine a first signal for the additional data using the useable portion of the cyclic prefix;
  - determine a second signal for a portion of the symbol corresponding to the useable portion of the cyclic prefix; and
  - combine the first signal and the second signal to generate a third signal; and
- a memory coupled to the at least one processor for storing data.

10. The apparatus of claim 9, wherein the at least one processor is configured to determine the existence of benign channel conditions.

11. The apparatus of claim 10, wherein the useable portion of the cyclic prefix is based on a channel quality.

12. The apparatus of claim 9, wherein the useable portion of the cyclic prefix is based on a delay spread which is a difference between receiving a first instance of the transmission and receiving a last instance of the transmission.

13. The apparatus of claim 9, wherein combining the first signal and the second signal comprises averaging the useable portion of the cyclic portion with a corresponding section of each symbol.

14. The apparatus of claim 9, wherein the non-standard use of cyclic prefixes is a cyclic prefix having a length not specified by long term evolution (LTE) specification standards.

15. The apparatus of claim 9, wherein the determining whether at least one of the first network device or the second network device is a small cell comprises determining whether at least one of the first network device and the second network device is a femtocell.

16. A wireless communication apparatus, comprising:
- means for receiving a transmission, from a second network device, comprising a symbol representing data and a cyclic prefix of a pre-defined length;
- means for determining if the second network device is compatible with non-standard use of cyclic prefixes;
- means for determining whether at least one of the first network device or the second network device is a small cell; and
- in response to the determination that the second network device is compatible with non-standard use of cyclic prefixes and the determination that first network device or the second network device is a small cell,
  - means for determining a useable portion of the cyclic prefix for transmission of additional data;
  - means for determining a first signal for the additional data using the useable portion of the cyclic prefix;
  - means for determining a second signal for a portion of the symbol corresponding to the useable portion of the cyclic prefix; and
  - means for combining the first signal and the second signal to generate a third signal.

17. The apparatus of claim 16, further comprising means for determining the existence of benign channel conditions.

18. The apparatus of claim 17, wherein the useable portion of the cyclic prefix is based on a channel quality.

19. The apparatus of claim 16, wherein the means for determining the useable portion of the cyclic prefix is based on determining a delay spread which is a difference between receiving a first instance of the transmission and receiving a last instance of the transmission.

20. The apparatus of claim 16, wherein the means for combining the first signal and the second signal comprises averaging the useable portion of the cyclic portion with a corresponding section of each symbol.

21. The apparatus of claim 16, wherein the non-standard use of cyclic prefixes is a cyclic prefix having a length not specified by long term evolution (LTE) specification standards.

22. The apparatus of claim 16, wherein the means for determining whether at least one of the first network device or the second network device is a small cell comprises determining whether at least one of the first network device and the second network device is a femtocell.

23. The apparatus of claim 16, wherein the non-standard use of cyclic prefixes is a cyclic prefix having a length not specified by long term evolution (LTE) specification standards.

24. A computer program product, comprising: a non-transitory computer-readable medium comprising code for causing at least one computer to:
- receive a transmission, from a second network device, comprising a symbol representing data and a cyclic prefix of a pre-defined length;
- determine if the second network device is compatible with non-standard use of cyclic prefixes;
- determine whether at least one of the first network device or the second network device is a small cell; and
- in response to the determination that the second network device is compatible with non-standard use of cyclic prefixes and the determination that first network device or the second network device is a small cell,
  - determine a useable portion of the cyclic prefix for transmission of additional data;
  - determine a first signal for the additional data using the useable portion of the cyclic prefix;
  - determine a second signal for a portion of the symbol corresponding to the useable portion of the cyclic prefix; and
  - combine the first signal and the second signal to generate a third signal.

25. The computer program product of claim 24, wherein the computer readable medium comprises code for further causing the at least one computer to determine the existence of benign channel conditions.

26. The computer program product of claim 25, wherein the useable portion of the cyclic prefix is based on a channel quality.

27. The computer program product of claim 25, wherein the useable portion of the cyclic prefix is based on a delay spread which is a difference between receiving a first instance of the transmission and receiving a last instance of the transmission.

28. The computer program product of claim 25, wherein combining the first signal and the second signal comprises averaging the useable portion of the cyclic portion with a corresponding section of each symbol.

29. The computer program product of claim 24, wherein the determining whether at least one of the first network device or the second network device is a small cell comprises determining whether at least one of the first network device and the second network device is a femtocell.

30. The computer program product of claim 24, wherein the non-standard use of cyclic prefixes is a cyclic prefix having a length not specified by long term evolution (LTE) specification standards.

\* \* \* \* \*